United States Patent

Morawski et al.

[15] 3,701,539

[45] Oct. 31, 1972

[54] WORK HOLDER FOR SPLINED WORKPIECES

[72] Inventors: London T. Morawski, Mt. Clemens; John J. Parker, Birmingham, both of Mich.

[73] Assignee: The John J. Parker Living Trust

[22] Filed: March 3, 1971

[21] Appl. No.: 120,447

[52] U.S. Cl. ...................279/1 G, 82/43, 269/52, 279/1 T
[51] Int. Cl. ...................................B23b 31/10
[58] Field of Search..........269/52; 279/1 R, 1 G, 1 T; 82/43

[56] References Cited

UNITED STATES PATENTS 2,805,864  9/1957  Parker et al................279/1 T

*Primary Examiner*—Francis S. Husar
*Attorney*—Barnes, Kisselle, Raisch & Choate

[57] ABSTRACT

A chuck for holding a splined workpiece having two relatively movable members each formed with a set of circumferentially spaced fingers thereon. The members being assembled with the fingers in circumferential interdigital relation. One of the members has two sets of axially spaced teeth thereon and the fingers on the other member have a single set of teeth thereon located axially between the two sets of spaced teeth on the other member. When a splined workpiece is telescoped over the fingers and one of the members is rotated the two sets of teeth on the one member engage one side face of the splines on the workpiece and the single set of teeth on the other member engage the opposite side face of the splines on the workpiece to firmly retain the workpiece on the holder.

12 Claims, 16 Drawing Figures

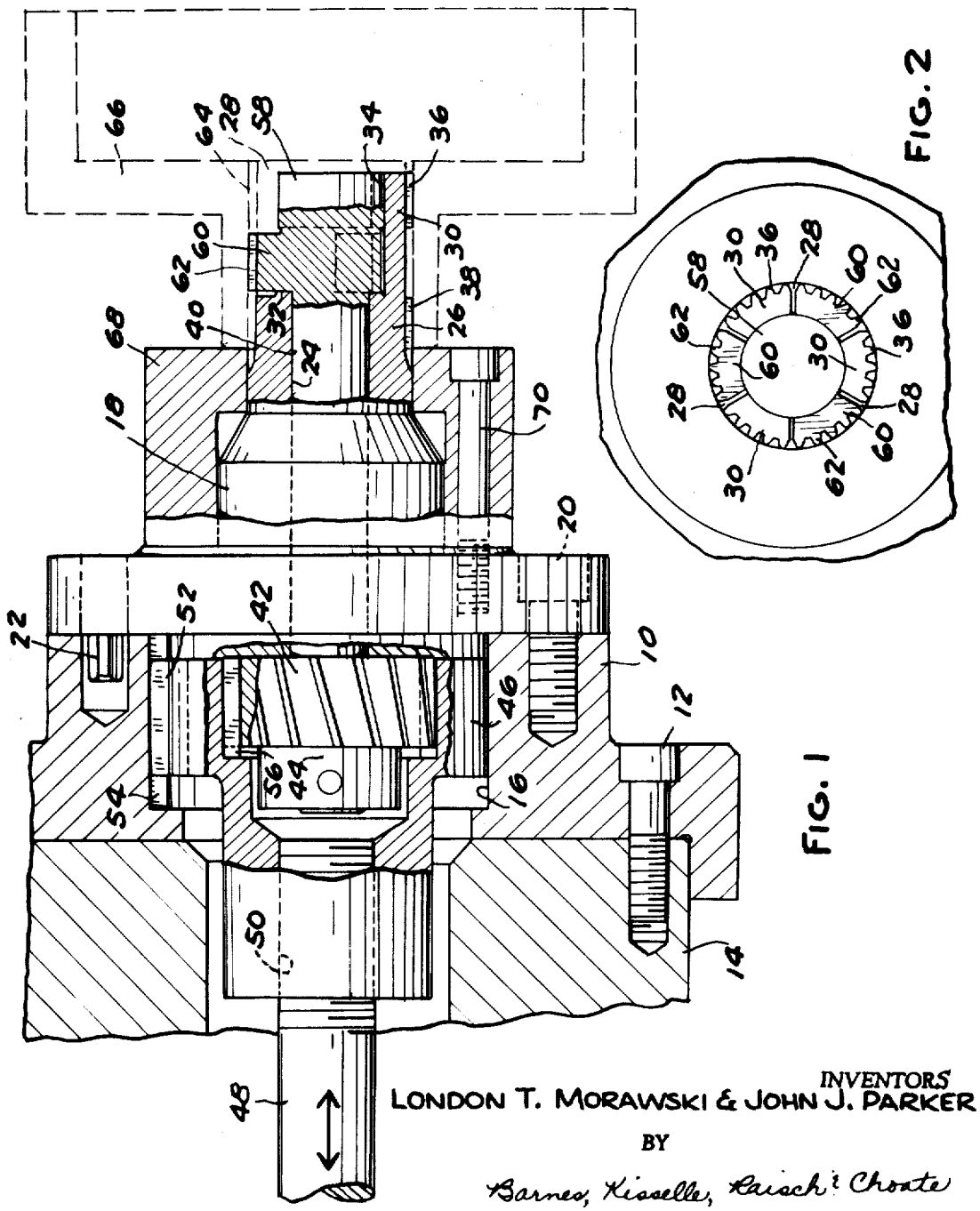

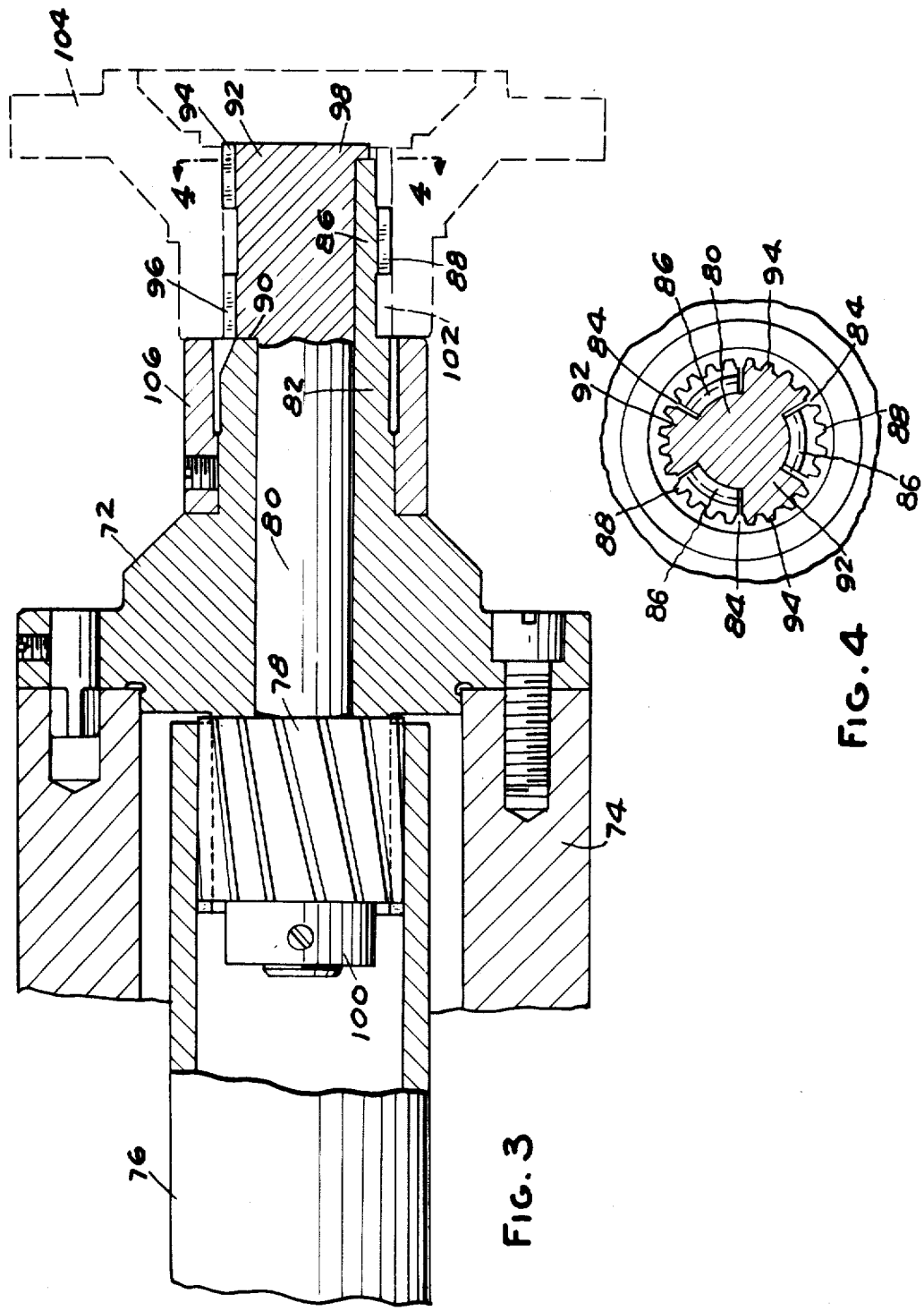

INVENTORS
LONDON T. MORAWSKI & JOHN J. PARKER

INVENTORS
LONDON T. MORAWSKI & JOHN J. PARKER
BY
Barnes, Kisselle, Raisch & Choate
ATTORNEYS

INVENTORS
LONDON T. MORAWSKI & JOHN J. PARKER

BY
Barnes, Kisselle, Raisch & Choate
ATTORNEYS

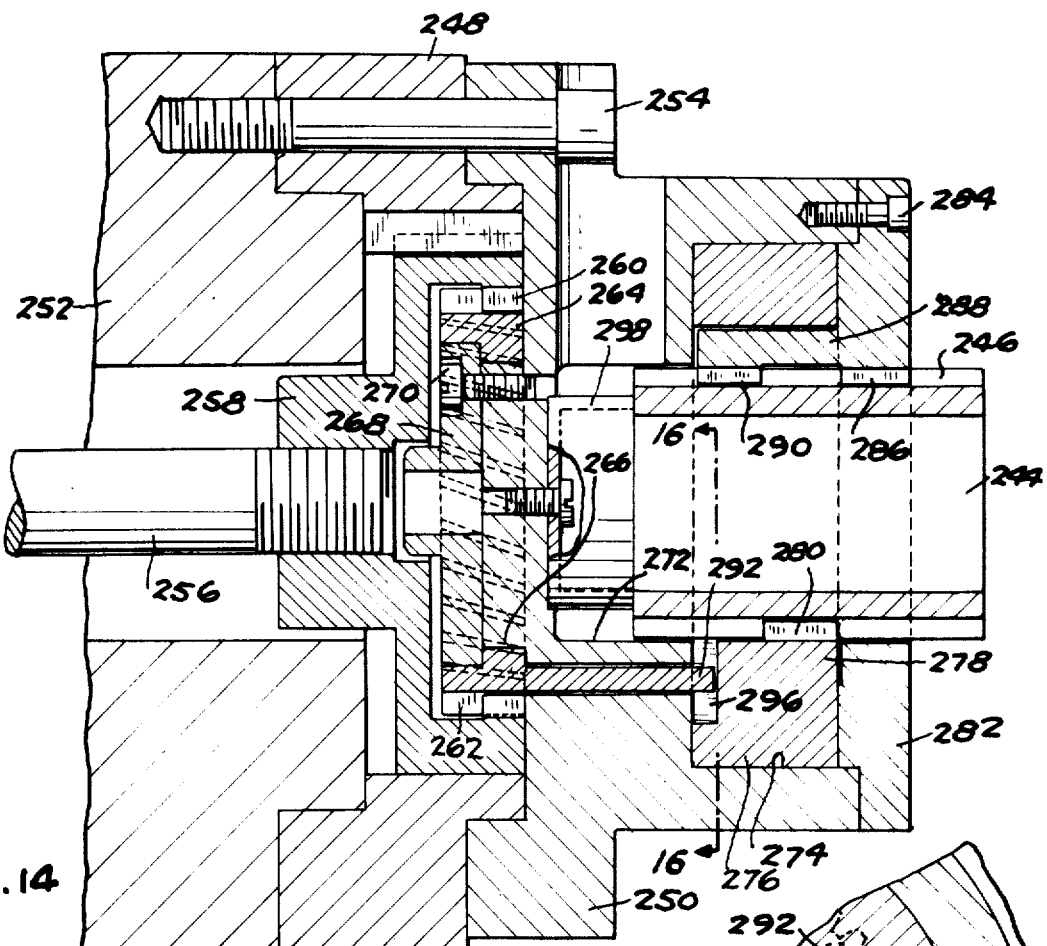
FIG. 14
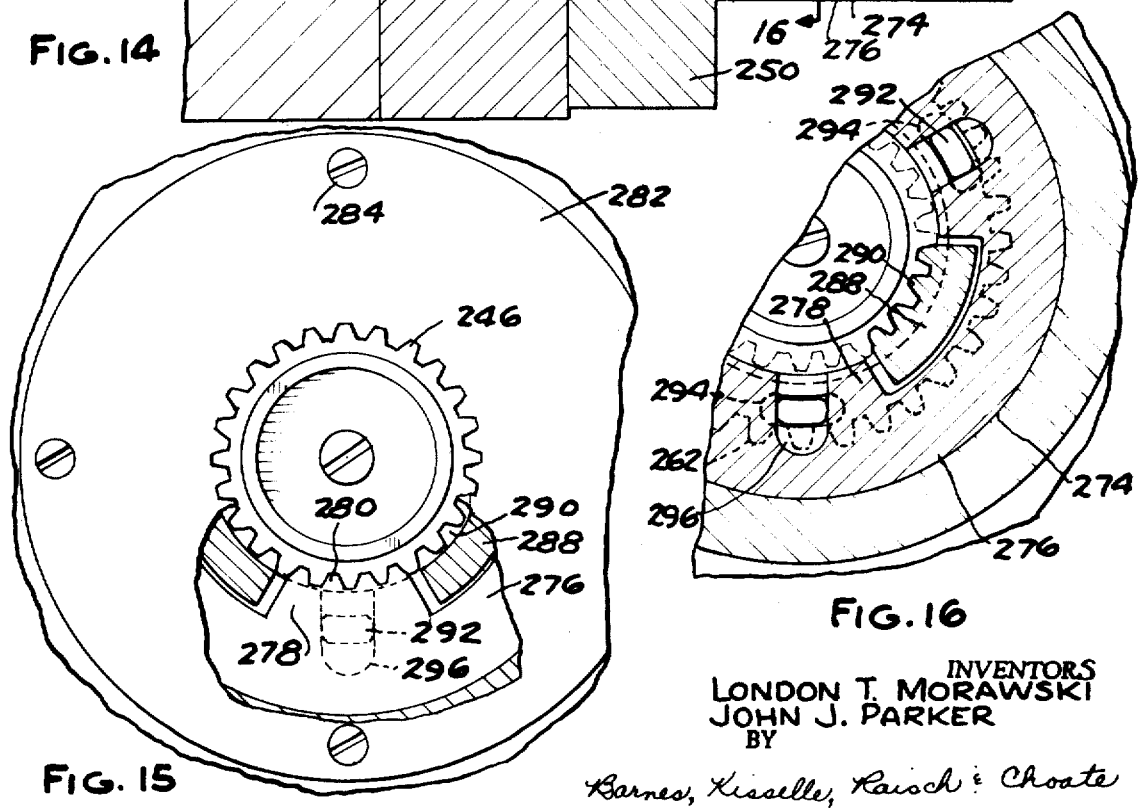
FIG. 15
FIG. 16
INVENTORS
LONDON T. MORAWSKI
JOHN J. PARKER
BY
Barnes, Kisselle, Raisch & Choate
ATTORNEYS

WORK HOLDER FOR SPLINED WORKPIECES

This invention relates to work holders in the form of a chuck or mandrel for splined workpieces.

One conventional type of chuck or mandrel for splined workpieces employs a pair of members having axially aligned teeth thereon which are relatively rotatable to shift the teeth on one of the members circumferentially relative to the teeth on the other member for engaging the splines of a workpiece. With this type of work holder, since the two sets of teeth are spaced axially, a slight cocking of the workpiece sometimes occurs when the two members are relatively rotated to lock the workpiece in place.

Another type of work holder for splined workpieces employs three members having axially aligned teeth thereon which result in an arrangement of two axially spaced sets of teeth and one set of teeth located between the two axially spaced sets. Means are provided for rotating the one set of teeth relative to the other two sets of teeth. With this type of arrangement the two members having the axially spaced teeth are bolted, splined or otherwise connected together and rotated as a unit relative to the other member. While this type of work holder eliminates the problem of cocking of the workpiece, its design is rendered somewhat complicated because of the necessity of physically connecting two of the members in a manner which provides for relative rotation of the two sets of teeth with respect to the other set of teeth. Furthermore, the design of this type of work holder is sometimes impractical when the splined workpiece to be held is of a relatively small diameter.

It is an object of this invention to provide a work holder for splined workpieces which eliminates the aforementioned problem of cocking of the workpiece and which is, nevertheless, of relatively simple design.

More specifically the work holder of the present invention is characterized by two relatively rotatable members, one of which has two axially spaced sets of teeth thereon and the other member having one set of teeth thereon disposed axially between the other two sets. The two sets of axially spaced teeth are adapted to be formed on a single member by forming the two members with circumferentially spaced fingers arranged in circumferentially interdigital relation, the teeth on the two members being formed at least in part on the fingers.

Other features and advantages of the work holder of the present invention will become apparent from the following description and drawings, in which:

FIG. 1 is a longitudinal sectional view with parts broken away of one form of chuck according to the present invention;

FIG. 2 is a fragmentary end view of the chuck shown in FIG. 1;

FIG. 3 is a longitudinal sectional view of another form of chuck of the present invention;

FIG. 4 is a sectional view along the line 4—4 in FIG. 3;

FIG. 14 is a longitudinal sectional view with parts broken away of another form of chuck according to the present invention;

FIG. 15 is a fragmentary end view of the chuck shown in FIG. 14 with parts broken away; and FIG. 16 is a fragmentary sectional view along line 16—16 in FIG. 14.

Figures 5, 6:
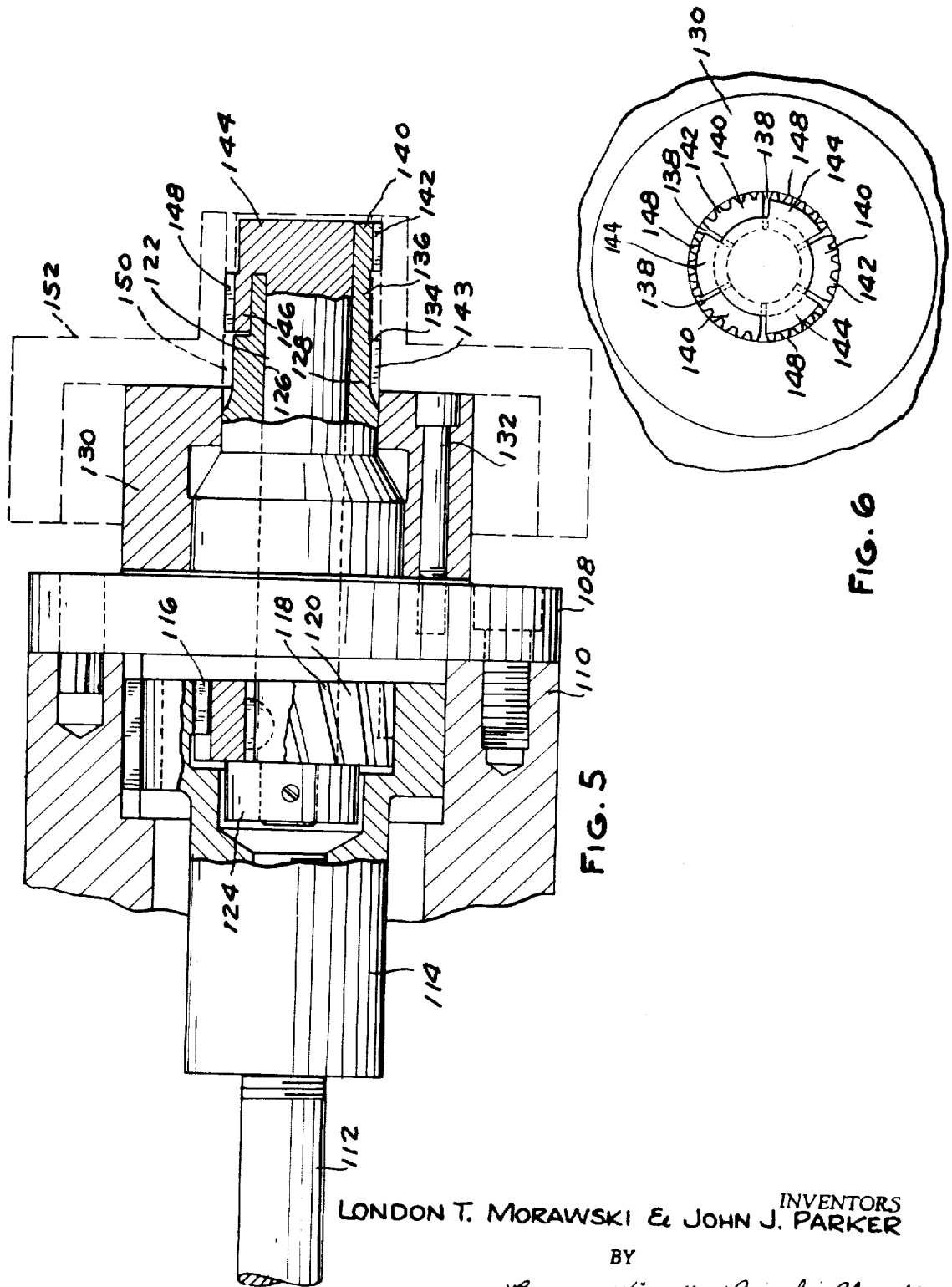
FIG. 5 is a longitudinal sectional view with parts broken away of another form of chuck according to the present invention.
FIG. 6 is a fragmentary end view of the chuck shown in FIG. 5.

Referring first to FIGS. 1 and 2, the chuck there illustrated includes a chuck body 10 which is mounted as by screw 12 to the end of a rotatably driven machine tool spindle 14. Body 10 is formed with an axially extending bore 16. On the front face of body 10 there is mounted an extension 18 which is secured to the body by screws 20 and dowel pins 22. Extension 18 is formed with an axially extending through bore 24 coaxial with bore 16. The forward end of extension 18 defines a sleeve 26 which is axially slotted at its free end at three circumferentially spaced zones 28 so as to define three circumferentially spaced fingers 30 (FIG. 2) which extend inwardly to the plane designated 32 in FIG. 1. The bore 34 around which the fingers 30 extend is slightly larger than the bore 24. Each of the fingers 30 are formed with radially outwardly projecting teeth 36 at the outer end thereof. Sleeve 26 is likewise formed with teeth 38 axially aligned with teeth 36.

Within bore 24 there is journalled a shaft 40 having a helical gear 42 keyed thereto within the enlarged bore 16 of body 10. A nut 44 is utilized for retaining gear 42 on shaft 40. Within bore 16 there is slideably arranged a large bushing 46 to which a drawbar 48 within the machine spindle 14 is threaded as at 50. Bushing 46 is prevented from rotating within bore 16 by means of a key 52 on the bushing engaging a keyway 54 in body 10.

Bushing 46 is formed internally with a plurality of helical teeth 56 which mesh with the helical teeth of gear 42. Thus, when drawbar 48 is shifted axially in one direction, gear 42 and shaft 40 are rotated in one direction and, when drawbar 48 is shifted axially in the opposite direction, gear 42 and shaft 40 are rotated in the opposite direction.

The outer end of shaft 40 is formed with a cylindrical bearing portion 58 having a close fit with bore 34 surrounded by fingers 30. Immediately adjacent the bearing portion 58 shaft 40 is formed with three radially extending lugs 60 which project outwardly through the slotted portions 28 between fingers 30. Lugs 60 are formed with teeth 62 at their radially outer ends. Teeth 36, 38, 62 all lie on approximately the same diameter, namely, the diameter of the splined opening 64 of workpiece 66.

As illustrated in FIG. 1, when drawbar 48 is in the forwardmost portion the three groups of teeth 62 at the outer end of each finger 60 are circumferentially located relative to the three groups of teeth 36 and the three groups of teeth 38 so that splined workpiece 66 can be telescoped over sleeve 26 into abutment with the workpiece locator 68. Locator 68 is mounted on extension 18 by screws 70. With the workpiece arranged in the manner described on sleeve 26, drawbar 48 is retracted, thus causing gear 42 to rotate slightly. The three fingers 60 are accordingly circumferentially shifted from the position shown in FIG. 2 to a position wherein the teeth 62 thereof lock against one side of certain splines in the workpiece 66 and the other teeth 36, 38 remain stationary and, accordingly, lock against the opposite side of other splines of the workpiece. Since the movable teeth 62 are located axially between the stationary teeth 36,38 there is no tendency for the workpiece to cock on the chuck when it is locked in place. Furthermore, it will be noted that the design of the chuck is such that teeth 36,38 can be readily machined on the single member 26 and teeth 62 can be readily machined on shaft 40 and located axially between teeth 36,38 by reason of the interdigital relationship of the two sets of fingers 30,60.

In the arrangement illustrated in FIGS. 3 and 4 the body 72 of the chuck is also secured to a machine tool spindle 74 and a drawbar 76 is interconnected with a helical gear 78 keyed to a shaft 80 such that the shaft is rotated in opposite directions in response to reciprocation of the drawbar. The forward end of chuck body 72 is fashioned with a sleeve 82 which is axially slotted at three points around its periphery, as indicated at 84, so as to form at the free end of sleeve 82 three circumferentially spaced, axially extending fingers 86. Fingers 86 are formed with teeth 88 around the outer faces thereof. Slots 84 extend inwardly of sleeve 82 to the radial plane designated 90 in FIG. 3. As shown in FIG. 3, it will be noted that teeth 88 are formed on fingers 86 inwardly of the free ends of the fingers.

Shaft 80 is formed at the outer end thereof with three fingers 92 which extend radially outwardly through slots 84. Each finger 92 is formed at its outer end with teeth 94 and 96. Teeth 94,96 are located on axially opposite sides of teeth 88. At the extreme free end of shaft 80 the shaft is provided with a radially outwardly extending lip 98 extending circumferentially between adjacent fingers 92 and abutting the free ends of fingers 86. Lip 98 cooperates with nut 100 on shaft 80 and helical gear 78 to prevent endwise movement of shaft 80 relative to body 72.

When the drawbar is shifted to its forward position illustrated in FIG. 3, teeth 88,94,96 are circumferentially related to enable the end of the chuck to engage with the splined portion 102 of a workpiece 104. As in the previous embodiment illustrated, when drawbar 76 is retracted shaft 80 is rotated to lock the workpiece on the end of the chuck by reason of the opposed forces exerted on the splines of the workpiece by teeth 88 on the one end and teeth 94,96 on the other. In order to properly locate the workpiece on the chuck a locator sleeve 106 is secured around the sleeve portion 82 of body 72.

In the arrangement illustrated in FIG. 5 the body of the chuck is designated 108, the machine tool spindle 110 and the drawbar 112. In a manner similar to the arrangement illustrated in FIGS. 1 and 2, a bushing 114 threaded to the end of drawbar 112 is provided with a plurality of helically arranged teeth 116 which engage with the helical teeth 118 of a gear 120 keyed to a shaft 122 and retained on the shaft by a nut 124. Shaft 122 extends through an axial bore 126 extending through chuck body 108 and a sleeve extension 128 thereof. A workpiece locator 130 extends around the sleeve extension 128 and is secured to the chuck body by screws 132.

Sleeve extension 128 is formed with an annular shoulder 134 and a portion of reduced thickness 136 adjacent shoulder 134. The extreme free end portion of sleeve 128 is formed with three axially extending slots 138 which define three circumferentially spaced axially extending fingers 140. Each finger 140 has teeth 142 formed around the outer side thereof at the extreme free end of the finger. Sleeve 128 has three groups of teeth 143 adjacent shoulder 134 which are axially aligned with the teeth 142.

The free end of shaft 122 is formed with three lugs or fingers 144 which extend radially outwardly through slots 138. Each finger 144 has a rearward extension 146 which overlaps the portion 136 of reduced thickness of sleeve 128. Each rearward extension 146 is formed with teeth 148 around the outer side thereof. Teeth 142,143, 148 are circumferentially related such that, when drawbar 112 is in its forwardmost position the teeth are aligned to receive the splined portion 150 of a workpiece 152. When drawbar 112 is retracted the three groups of teeth 148 on fingers 144 are shifted circumferentially relative to teeth 142,143 to thereby firmly clamp the workpiece on the chuck.

Figure 7:
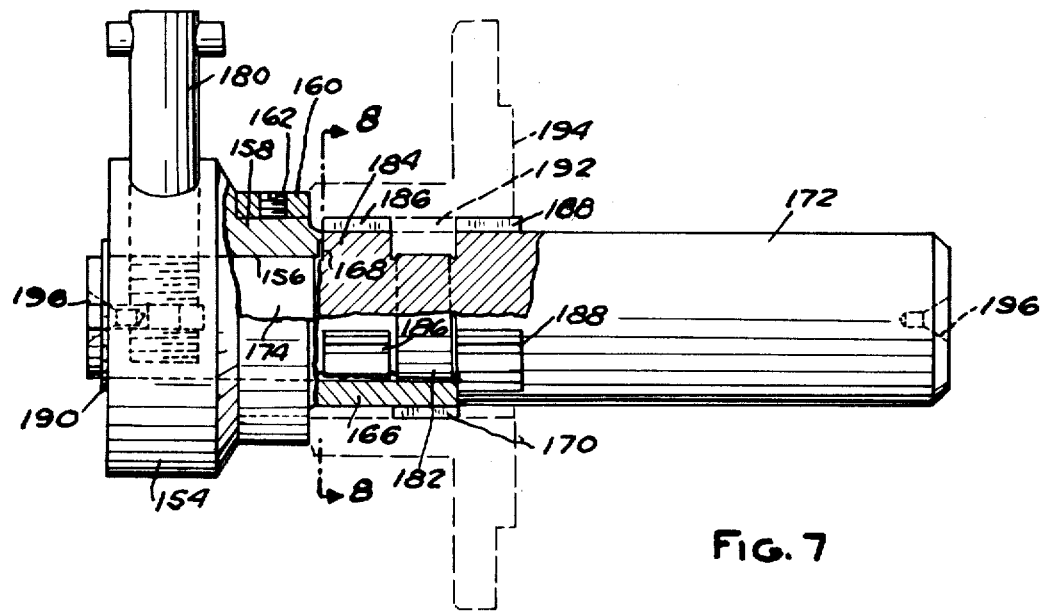
FIG. 7 is a side elevational view with parts broken away of a mandrel according to the present invention.
Figure 9:
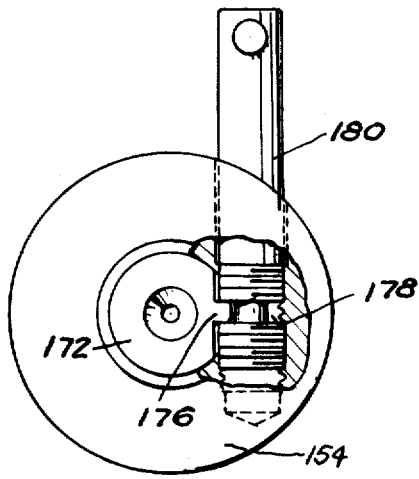
FIG. 9 is an end view of the mandrel shown in FIG. 7 with parts broken away.
Figure 8:
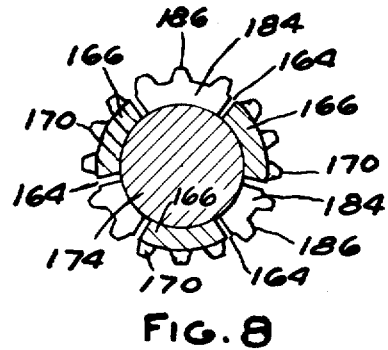
FIG. 8 is a sectional view along the line 8—8 in FIG. 7.

In FIGS. 7 through 9 the invention is shown applied to a mandrel, the body of which is designated 154. Body 154 is formed with an axially extending bore 156 and a sleeve extension 158 at one end thereof. A workpiece locator in the form of a bushing 160 is secured around sleeve 158 by a screw 162. Sleeve 158 is axially slotted at three locations around its periphery as indicated at 164 to define three axially extending fingers 166 at the free end of extension 158. Slots 164 terminate in the radial plane designated 168 in FIG. 7. Each finger 166 is formed with teeth 170 around the radially outer side thereof.

A shaft 172 has a reduced end portion 174 journalled in bore 156 of body 154. As shown in FIG. 9, a radial lug 176 on shaft 172 is engaged by an annular groove 178 in a stem 180 threaded into body 154. With this arrangement as stem 180 is advanced and retracted in body 154 shaft 172 is caused to rotate in opposite directions.

Between its enlarged and reduced ends shaft 172 is formed with a cylindrical bearing portion 182 seated within the portion of bore 156 formed by fingers 166. Axially adjacent the bearing portion 182 the shaft is formed with three fingers 184 which project radially outwardly through slots 164 between fingers 166. The outer ends of fingers 184 are formed with teeth 186. The enlarged portion of shaft 172 is also formed with three groups of teeth 188 which are axially aligned with teeth 186. Shaft 172 is retained in assembled relation with body 154 by a snap ring 190.

In operation stem 180 is rotated such that the three sets of teeth 170,186,188 are circumferentially related to align with the splines 192 of a workpiece 194. The workpiece is slipped over the enlarged end of the shaft into abutment with locator bushing 160 as shown in FIG. 7. Thereafter, stem 180 is rotated to shift teeth 186,188 circumferentially relative to teeth 170 and thereby interlock with the splines of the workpiece and retain the workpiece firmly on the mandrel. The opposite ends of shaft 172 are center drilled as indicated at 196 so that the mandrel can be mounted between centers and the workpiece retained thereon can be subjected to inspection, such as for dimensions, concentricity, etc.

The mandrel illustrated in FIGS. 10 through 13 includes a body 198 formed with a central bore 200 in which a shaft 202 is journalled. A stem 204 threaded into body 198 has an annular groove 206 which engages with a radial lug 208 on shaft 202 so that the shaft is rotated in opposite directions as stem 204 is threaded into and out of body 198.

Figure 10:
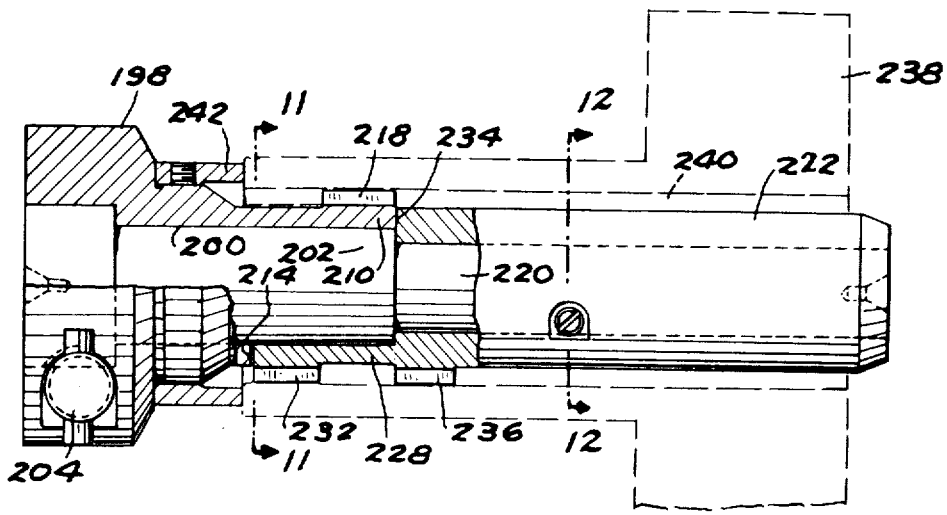
FIG. 10 is a side elevational view with parts broken away of another form of mandrel according to the present invention.
Figure 13:
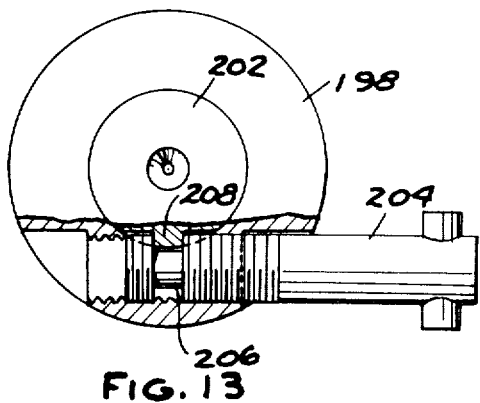
FIG. 13 is an end view of the mandrel shown in FIG. 10 with parts broken away.
Figure 11:
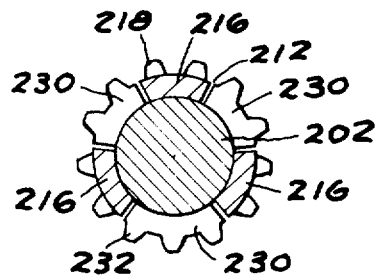
FIG. 11 is a sectional view along the line 11—11 in FIG. 10.
Figure 12:
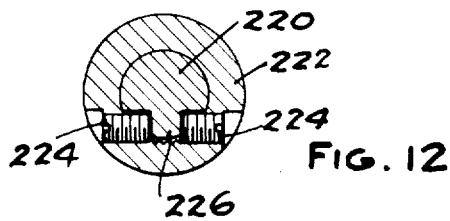
FIG. 12 is a sectional view along the line 12—12 in FIG. 10.

Body 198 is formed with a sleeve extension 210 which is axially slotted at three equally spaced points around its periphery as at 212. Slots 212 extend inwardly from the free end of sleeve extension 210 to a shoulder 214 and define three axially extending fingers 216 having axially extending teeth 218 around the radially outer faces thereof. As shown in FIG. 10, teeth 218 are located adjacent the free ends of fingers 216 and are spaced axially outwardly from shoulder 214. Shaft 202 has a reduced end portion 220 on which a sleeve 222 is secured by means of a pair of screws 224 which engage a lug 226 on the reduced portion 220 of the shaft. Sleeve 222 has an extension 228 of reduced thickness. Extension 228 is defined by three axially extending fingers 230 which are disposed in interdigital relation with fingers 216. Fingers 230 are formed with teeth 232 around the radially outer faces thereof. Teeth 232 are formed at the free ends of fingers 230 and are spaced axially from the inner ends 234 of the slots defining the fingers. Sleeve 222 is also formed with three groups of teeth 236 around the portion thereof axially adjacent fingers 230, teeth 236 being axially aligned with teeth 232.

The operation of the mandrel shown in FIGS. 10 through 13 is substantially the same as the operation of the mandrel shown in FIGS. 7 through 9. The workpiece 238 is slipped over the mandrel to interengage the splines 240 thereof with teeth 218, 232,236. When the end of the workpiece abuts the locating bushing 242 stem 204 is rotated to shift teeth 232,236 circumferentially relative to teeth 218 and thereby lock the workpiece on the mandrel.

The chuck shown in FIGS. 14 through 16 is designed for holding a workpiece 244 provided with external splines 246 around its outer periphery. The chuck comprises a main body 248 with a front extension 250, both of which are secured to the machine tool spindle 252 by screws 254. The drawbar 256 of the machine tool is connected with a gear member 258 having internal helical gear teeth 260 which mesh with helical gear teeth 262 of ring gear 264. Gear 264 is rotatably supported on a boss 266 formed on extension 250 and is clamped in place by a plate 268 and screws 270. Gear 264 is rotated in opposite directions in response to reciprocation of drawbar 256.

Body extension 250 is formed with a bore 272 sufficiently large to receive workpiece 244 and with an enlarged counterbore 274. Within counterbore 274 there is journalled a ring 276 having three circumferentially spaced, radially inwardly extending lugs or fingers 278. Fingers 278 are formed with axially extending teeth 280 at the radially inner ends thereof. A front plate 282 is secured to the front end of body extension 250 by screws 284. Front plate 282 is centrally apertured, the aperture being defined in part by three groups of axially extending teeth 286. Front plate 282 is also provided with three circumferentially spaced fingers 288 which project axially inwardly between the fingers 278 on ring 276. The inner ends of fingers 288 are formed with teeth 290 around the inner faces thereof which are aligned axially with teeth 286. Teeth 280 on ring 276 lie axially intermediate teeth 286,290.

Gear 264 has a plurality of pins 292 secured thereto and projecting axially forwardly therefrom. Pins 292 extend through arcuate slots 294 in body extension 250 and their forward ends engage with radial slots 296 in ring 276. Thus, when gear 264 is rotated in opposite directions by reciprocation of drawbar 256, ring 276 is shifted circumferentially in opposite directions relative to front plate 282. With this form of chuck, when the drawbar is in the forwardmost position illustrated in FIG. 14, teeth 280,286,290 are circumferentially aligned to receive the splines 246 of workpiece 244 and allow the workpiece to be inserted into the chuck until the end thereof abuts the locator cup 298. Thereafter drawbar 256 is retracted to shift ring 276 and the teeth 280 thereon circumferentially relative to teeth 286 and 290 to firmly clamp the workpiece in the chuck.

Thus, it will be seen that in each of the embodiments illustrated herein the splines of the workpiece are designed to be engaged by three sets of teeth, namely, two sets of teeth spaced axially apart and one set of teeth disposed axially between the other two. The intermediate set of teeth is circumferentially shiftable relative to the other two sets so that when the workpiece is clamped it is maintained in an accurately aligned position relative to the axis of the work holder. Furthermore, it will be noted that the two sets of teeth which are axially spaced apart are formed integrally with one of the two work holding members of the chuck and the third set of teeth is formed integrally with the other work holding member of the chuck. This particular configuration is made possible by forming the two teeth-bearing members with fingers which are adapted to be assembled in interdigital relation.

We claim:

1. A work holder for a splined workpiece comprising a body having a central axis, a first member fixedly mounted on said body and having a plurality of fingers thereon spaced circumferentially about said axis, a second member journalled on said body for rotation about said axis, said second member also having a plurality of fingers thereon spaced circumferentially about said axis, the fingers of said two members being in circumferential interdigital relation about said axis, one of said members having two sets of radially extending teeth thereon spaced apart axially and concentric with said axis, at least one of said sets of teeth being formed on said fingers, the other member having a single set of teeth thereon formed on the fingers thereof and located axially between the other two sets of teeth, said three sets of teeth being arranged to engage the splines of a splined workpiece and means for rotating one of said two members about said axis such that the teeth in said one set act in opposition to the teeth in said two sets of teeth to interlock with the splines of a workpiece and thereby firmly support the workpiece on the work holder.

2. A work holder as called for in claim 1 wherein the two axially spaced sets of teeth are formed on the first member.

3. A work holder as called for in claim 1 wherein the two axially spaced sets of teeth are formed on the second member.

4. A work holder as called for in claim 1 wherein said two members comprise a telescopically engaged shaft and sleeve.

5. A work holder as called for in claim 4 wherein at least a portion of the shaft forms a cylindrical bearing for the sleeve.

6. A work holder as called for in claim 1 wherein said fingers comprise radially extending arcuate segments.

7. A work holder as called for in claim 6 wherein said segments are dimensioned to provide clearance between circumferentially adjacent segments.

8. A work holder as called for in claim 7 wherein said teeth are formed on the radially outer faces of the segments.

9. A work holder as called for in claim 7 wherein the teeth are formed on the radially inner faces of said segments.

10. A work holder as called for in claim 1 wherein said one set of teeth and one of said two sets of teeth are divided circumferentially into spaced groups with the groups of one set circumferentially offset with respect to the groups of the other set.

11. A work holder as called for in claim 1 wherein said first member comprises an extension at one end of said body having a bore therethrough co-axial with said axis, the first-mentioned fingers extending axially from said extension, said second member comprising a shaft journalled in said bore and extending therethrough from the free ends of the first-mentioned fingers into said body, the second-mentioned fingers comprising a plurality of lugs on said shaft projecting radially outwardly between the fingers on said extension.

12. A work holder as called for in claim 11 wherein said single set of teeth are formed on the radially outer ends of said lugs.

* * * * *